United States Patent
Maki

(10) Patent No.: US 6,201,658 B1
(45) Date of Patent: Mar. 13, 2001

(54) MEMORY UNIT HAVING A PLURALITY OF HEADS CONTROLLED BY A MINIMUM NUMBER OF CONNECTION LINES

(75) Inventor: Shinichi Maki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/843,835

(22) Filed: Apr. 21, 1997

Related U.S. Application Data

(63) Continuation of application No. 08/491,276, filed on Jun. 16, 1995, now abandoned.

(30) Foreign Application Priority Data

Jul. 28, 1994 (JP) .................................................. 6-177256

(51) Int. Cl.$^7$ ............................ G11B 21/02; G11B 15/12
(52) U.S. Cl. ............................... 360/75; 360/61; 360/63
(58) Field of Search ............................... 360/75, 104, 64, 360/126, 77.08, 66, 113, 78.04, 77.04, 77.02, 46, 67, 61, 63; 370/110.1; 347/11; 395/441; 711/4, 167

(56) References Cited

U.S. PATENT DOCUMENTS

| | | | |
|---|---|---|---|
| 4,642,716 | * | 2/1987 | Wakabayashi et al. .............. 360/104 |
| 4,669,004 | * | 5/1987 | Moon et al. .................. 360/77.01 X |
| 4,819,153 | * | 4/1989 | Graham et al. ...................... 360/75 X |
| 4,894,797 | * | 1/1990 | Walp .................................... 711/109 |
| 5,018,095 | * | 5/1991 | Nissimov ................................. 711/4 |
| 5,430,584 | * | 7/1995 | Petersen ............................. 360/78.04 |
| 5,488,518 | * | 1/1996 | Shier .................................... 360/46 X |
| 5,491,395 | * | 2/1996 | HUtsell et al. ............... 360/78.04 X |

FOREIGN PATENT DOCUMENTS

| | | |
|---|---|---|
| 52-90014 | 7/1977 | (JP) . |
| 60-219674 | 11/1985 | (JP) . |
| 61-182909 | 11/1986 | (JP) . |
| 3-44866 | 2/1991 | (JP) . |
| 3-95620 | 4/1991 | (JP) . |
| 6-30505 | 4/1994 | (JP) . |

OTHER PUBLICATIONS

R. Sarbacher, Encyclopedic Dictionary of Electronics and Nuclear Engineering, p 1300, 1959.*

* cited by examiner

*Primary Examiner*—Paul Loomis
*Assistant Examiner*—K. Wong
(74) *Attorney, Agent, or Firm*—Greer, Burns & Crain, Ltd.

(57) ABSTRACT

A memory unit having a plurality of heads performing at least one of recording or reproducing operations on a storage medium is disclosed. The memory unit includes a first converter circuit for receiving head-selection signals as first parallel data and converting the head-selection signals to first serial data to be transmitted, and a second converter circuit for receiving the first serial data from the first converter circuit and converting the first serial data to second parallel data to be transmitted. The memory unit further includes a head control circuit for receiving the second parallel data from the second converter circuit and selectively driving the heads on the basis of the second parallel data.

13 Claims, 13 Drawing Sheets

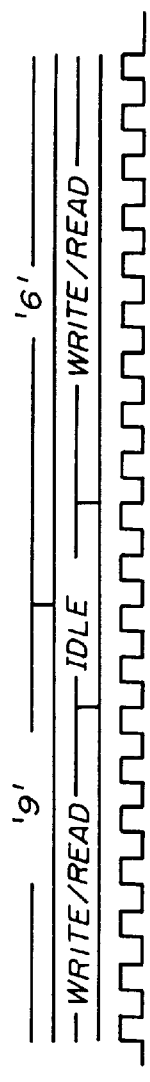
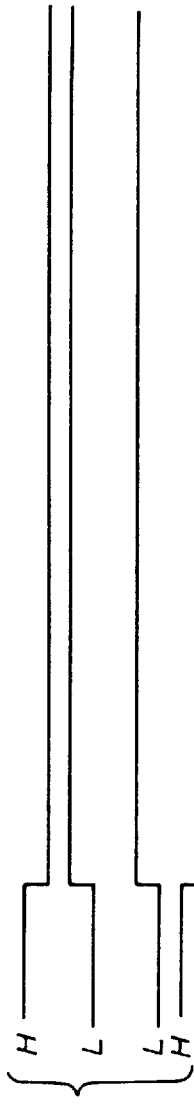
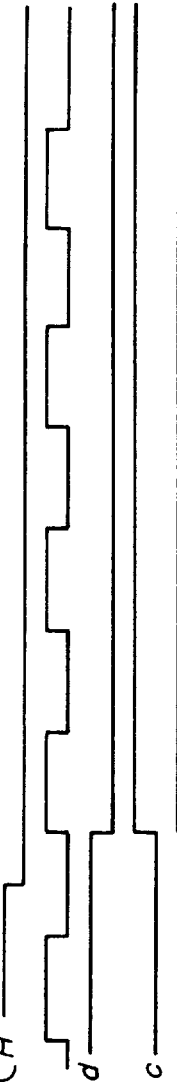
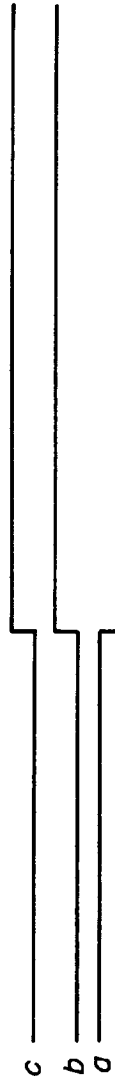
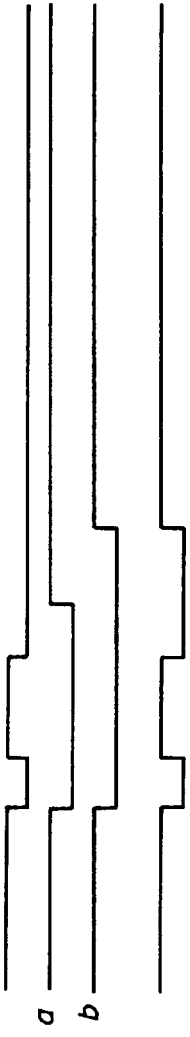
FIG. 6A HEAD SELECTION
FIG. 6B HEAD CONDITION
FIG. 6C REFERENCE CLOCK
FIG. 6D HEAD-SELECTION SIGNAL
FIG. 6E CLOCK
FIG. 6F OUTPUT OF A FIRST FF
FIG. 6G OUTPUT OF A SECOND FF
FIG. 6H OUTPUT OF A COMPARATOR
FIG. 6I CLOCK
FIG. 6J OUTPUT OF A FIRST SHIFTRESISTOR
FIG. 6K OUTPUT OF A CONTROL CIRCUIT
FIG. 6L CONTROL DATA

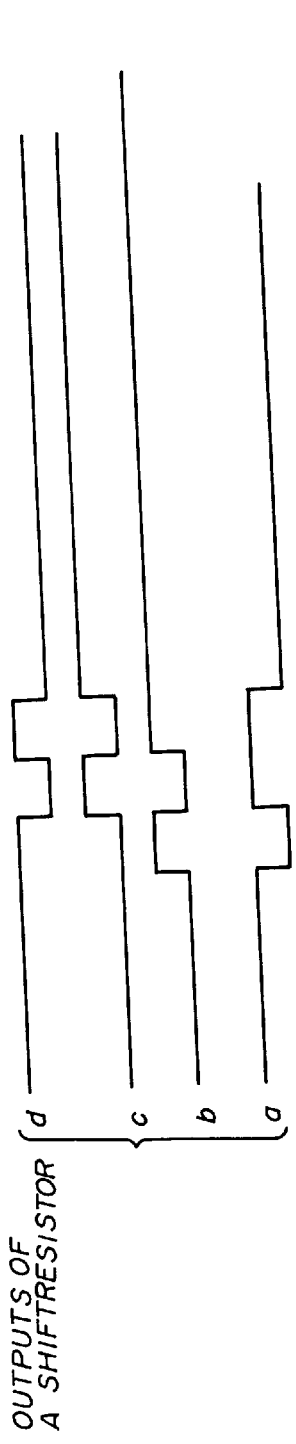
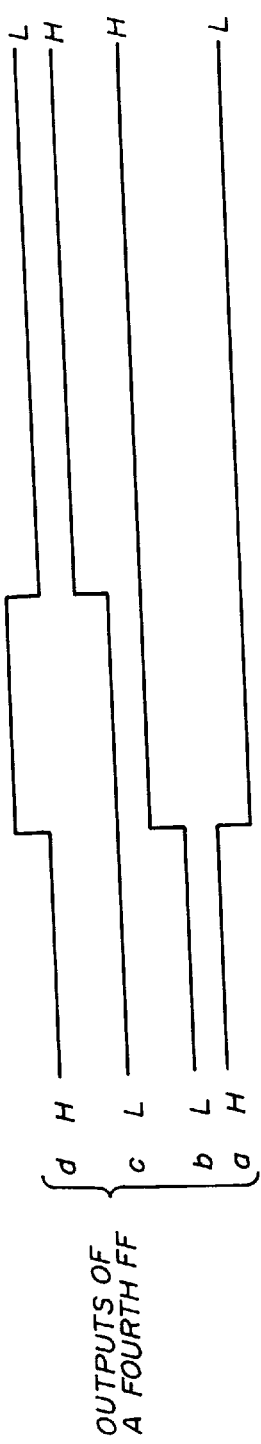
FIG.7A  SERIAL CLOCK
FIG.7B  OUTPUTS OF A SHIFTRESISTOR
FIG.7C  OUTPUTS OF A FOURTH FF
FIG.7D

| | |
|---|---|
| WIDTH OF AN FPC (W) | = 28mm |
| PATTERN WIDTH OF A GND (We2) | = 8mm |
| PATTERN WIDTHS OF 12V, 5V (B) | = 3mm |
| OTHER PATTERN WIDTHS (C) | = 1mm |
| INTERVAL WIDTH BETWEEN PATTERNS (D) | = 1mm |
| SPACES (A) | = 1mm |

| | |
|---|---|
| WIDTH OF AN FPC (W) | = 28mm |
| PATTERN WIDTH OF A GND (We1) | = 3mm |
| PATTERN WIDTHS OF 12V, 5V (B) | = 3mm |
| OTHER PATTERN WIDTHS (C) | = 1mm |
| INTERVAL WIDTH BETWEEN PATTERNS (D) | = 1mm |
| SPACES (A) | = 1mm |

PATTERN WIDTHS OF 12V, 5V, GND (B) = 3mm
OTHER PATTERN WIDTHS (C) = 1mm
INTERVAL WIDTH BETWEEN PATTERNS (D) = 1mm
SPACES (A) = 1mm

MEMORY UNIT HAVING A PLURALITY OF HEADS CONTROLLED BY A MINIMUM NUMBER OF CONNECTION LINES

This is a continuation of application Ser. No. 08/491,276 filed on Jun. 16, 1995 now abandoned.

BACKGROUND OF THE INVENTION

1. Field of the Invention

The present invention generally relates to a memory unit which records or reproduces to-or-from a storage medium through a plurality of heads, and more particularly, to a memory unit in which a head assembly having the plurality of heads is connected with a printed circuit board having control circuits through lines.

2. Description of the Prior Art

Recently, electronic devices have been further miniaturized, and it is desired to also miniaturize a memory unit used for an external storage unit of a computer, etc. More specifically, in a magnetic disk unit which records and reproduces to-and-from a storage medium through a plurality of heads assembled in a head assembly, the number of lines connected between the head assembly and a printed circuit board having control circuits needs to be reduced.

FIG. 1 shows a schematic block diagram of an interface circuit of a conventional magnetic disk unit. A magnetic disk unit 11 shown in FIG. 1 comprises a head assembly 12 for assembling a plurality of heads, a printed circuit board 15 for controlling the head assembly 12, and a plurality of lines connecting between the head assembly 12 and the printed circuit board 15.

In the head assembly 12, differential-type heads 13-1 to 13-16 for recording and reproducing to-and-from a plurality of magnetic disks are assembled. Included in the head assembly 12 is a head IC 14, which selects one of the heads 13-1 to 13-16, and transmits-and-receives write-data/and/read-data. The head IC 14 is also fabricated on a flexible printed circuit board.

On the other hand, the plurality of lines between the head assembly 12 and the printed circuit board 15 comprise twelve lines which include, four head-selection signal lines 16-1 to 16-4, write-data signal lines 17-1, 17-2, read-data signal lines 18-1, 18-2, a write-gate signal line 19, a ground (GND) line 20, and two-types (12 V and 15 V) power-supply lines 21-1, 21-2.

These signal line are constructed by flexible print circuits (FPC) or flat cables, etc., between the printed circuit board 15 and the head assembly 12.

For selecting one of the sixteen heads 13-1 to 13-16, four-bit signals are needed. The above four head-selection signal lines 16-1 to 16-4 are set for these four-bit signals. In this way, a number of the head-selection signal lines is determined by a number of bits necessary for selecting one of heads.

FIG. 2 shows a connecting configuration of the interface circuit in the conventional magnetic disk unit shown in FIG. 1. In an example shown in FIG. 2, the head assembly 12 is installed such that the sixteen heads 13-1 to 13-16 are close to magnetic disks 22-1 to 22-8. Each of these heads 13-1 to 13-16 is mounted at the top of suspension gimbals 24 connected with a carriage 23 and can be moved in a radial direction of the magnetic disks 22-1 to 22-8.

Two signal lines from each of the heads 13-1 to 13-16 are connected to associated pattern lines 26 on the flexible printed circuit board 25 through the suspension 24 and the carriage 23. Each of the pattern lines 26 on the flexible printed circuit board 25 are routed to ports of the head IC 14 mounted thereon.

On the other side of the head IC 14, each port of the head IC 14 is connected to an associated port of one side of an FPC 27. Also on the other side of the FPC 27, a connector 28a is assembled. In the FPC 27, the above mentioned twelve lines, 16-1 to 16-4, 17-1, 17-2, 18-1, 18-2, 19, the GND line 20, and the power-supply lines 21-1, 21-2, are formed by patterns 27a. Thick lines of the patterns 27a are allocated to the GND line 20 and the power-supply lines 21-1, 21-2.

On the other hand, the printed circuit board 15 for controlling and driving the magnetic disk unit 11 comprises a connector 28b, which is connected with the connector 28a, so as to connect between the printed circuit board 15 and the head assembly 12.

To miniaturize the magnetic disk unit 11, the number of lines between the printed circuit board 15 and the head assembly 12 also needs to be reduced. For this purpose, an example of reducing the number of connection lines by transmitting data in series is disclosed in Japanese Laid-open Patent No. 6-30505. In this example, a system, in which a main control unit is connected with a peripheral unit through a single data signal line and a single clock signal line, is disclosed. In this system, during one serial transmission, "information of data-transmit/receive directions", "information of a data type", and "information of data" are transmitted and received in that order.

To miniaturize the magnetic disk unit 11, the width of the FPC 27, namely the width of each pattern 27a, needs to be thinner. However, reducing the width of the pattern 27a any more causes noise due to voltage fluctuation. There is thus a problem that it is hard to miniaturize recording-and-reproducing units, such as a magnetic disk unit by thinning the width of each pattern 27a of the FPC 27.

SUMMARY OF THE INVENTION

It is an object of this invention to provide a memory unit. The size of the unit can be miniaturized by reducing the number of signal lines of the unit. Also, noise which may occur in the unit can be reduced. This permits the disadvantages described above to be eliminated.

The object described above is achieved by a memory unit having a plurality of heads performing at least one of recording or reproducing operations on a storage medium, the memory unit comprising: a first converter circuit for receiving head-selection signals as first parallel data and converting the head-selection signals to first serial data to be transmitted; a second converter circuit for receiving the first serial data from the first converter circuit and converting the first serial data to second parallel data to be transmitted; and a head control circuit for receiving the second parallel data from the second converter circuit and selectively driving the heads on the basis of the second parallel data.

In the above memory unit, the first converter circuit may be located on a printed circuit board controlling the memory unit, and the second converter circuit may be located inside a disk enclosure having the heads and the storage medium.

The object described above is also achieved by the memory unit mentioned above, wherein the memory unit further comprises a connecting circuit, including a line for the head-selection signal in the serial data form, for connecting the first converter circuit and the second converter circuit together, and the line has conductive patterns formed on a flexible material.

The object described above is also achieved by a memory unit having a plurality of heads performing at least one of recording or reproducing operations on a storage medium, the memory unit comprising: a first switching circuit for switching between transmission of record data to the heads and reception of reproduced data from the heads; and a second switching circuit for switching between reception of the record data from the first switching circuit and transmission of the reproduced data from the heads to the first switching circuit.

In the above memory unit, the first switching circuit may be located on a printed circuit board controlling the memory unit, and the second switching circuit may be located inside a disk enclosure having the heads and the storage medium.

The object described above is also achieved by the memory unit mentioned above, wherein the memory unit further comprises connecting circuit, including a line for the record data and the reproduced data, for connecting the first switching circuit and the second switching circuit together, and the line has a conductive pattern formed on a flexible material.

In the above memory units, the connecting circuit further comprises a first pattern of predetermined width and second patterns of predetermined width, the first pattern of predetermined width being wider than the second patterns of predetermined width and being formed on the flexible material.

The first pattern of predetermined width may be connected to a ground. And the first pattern of predetermined width may provide a disk enclosure bias inside the unit.

According to the memory unit, the head-selection signal is transmitted as serial data from the first converter circuit to the second converter circuit through the connecting circuit. In the second converter circuit, the head-selection signal is converted from serial data to parallel data, which is transmitted to the head control circuit to a selected one of the heads.

Therefore, the number of head-selection signal lines of the connecting circuit may be reduced, thus the whole unit size may be reduced. Further, external noise affection and interference between the signal lines may be reduced, the above makes it possible to reduce noise otherwise applied to the control data such as the head-selection signal.

According to the memory unit, the record data to the heads and the reproduced data from the heads are switched in the first and the second switching circuits. Namely, the record data and the reproduced data are time-divisionally transmitted between the first and the second switching circuits through the same line of the connecting circuit.

Therefore, the number of data-transmission lines of the connecting circuit may be reduced, thus the whole unit size may be reduced. Further, the affection of external noise and the interference between the signal lines may be reduced, so as to reduce noise applied to the record data and the reproduced data.

According to the memory unit, the wide-width patterns are formed on the flexible material for the ground line and the disk-enclosure bias line. Therefore, the impedances of the patterns may be reduced, so that the noise applied to the transmission data also may be reduced.

Other objects and further features of the present invention will be apparent from the following detailed description when read in conjunction with the accompanying drawings.

BRIEF DESCRIPTION OF THE DRAWINGS

FIGS. 6A to 6L show time charts of each of the signals of the parallel-to-serial converter shown in FIG. 4;

FIGS. 7A to 7D show time charts of each of the signals of the serial-to-parallel converter shown in FIG. 5;

DESCRIPTION OF THE PREFERRED EMBODIMENTS

Figure 3:
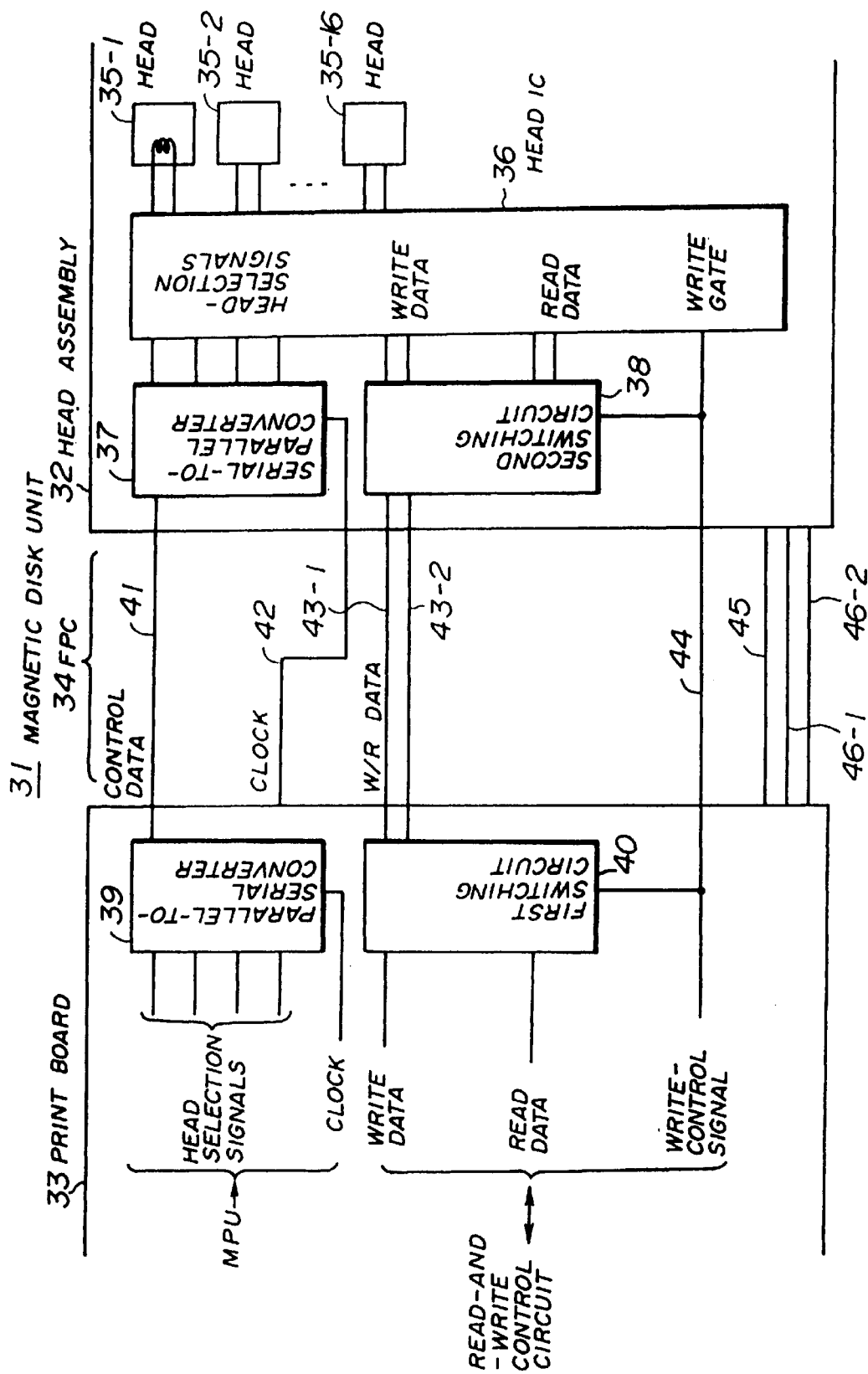
FIG. 3 shows a block diagram of a first embodiment of a magnetic disk unit according to the present invention.

First, a description will be given of a first embodiment of a memory unit according to the present invention, by referring to FIG. 3. FIG. 3 shows a block diagram of the first embodiment of a magnetic disk unit 31 according to the present invention. The magnetic disk unit 31 comprises a head assembly 32, a printed circuit board 33, and a flexible print circuit (FPC) 34 connecting them.

The head assembly 32 includes sixteen differential-type heads 35-1 to 35-16 for recording and reproducing to-and-from a plurality of magnetic disks. Two signal lines from each of the heads 35-1 to 35-16 are connected to a head IC 36 also referred to as head control means. This head IC 36 selects a given head from the heads 35-1 to 35-16, and supplies a current according to record data to the given head or derives a current wave according to read data from the given head.

The head IC 36 has four-bit head-selection ports, the number of which is determined according to the number of heads. And, to the head-selection ports, four-bit head-selection parallel signals are supplied from a serial-to-parallel converter 37 which constitutes a first conversion means. Further, to write-data ports of the head IC 36, write data (record data) is supplied from a second switching circuit 38 constituting a second switching means, and from readout port of the head IC 36, read data (reproduced data) is produced to the second switching circuit 38. A write-control signal is supplied to a write-gate port of the head IC 36.

On the other hand, the printed circuit board 33 assembles a variety of circuits, such as a microprocessor (MPU), a parallel-to-serial converter 39, a read-and-write control circuit, and a first switching circuit 40, for controlling the magnetic disk unit 31. In the printed circuit board 33, in response to an order of a host unit, the MPU supplies four-bit head-selection parallel signals in synchronous to a clock to the parallel-to-serial converter 39 constituting a second conversion means. In the parallel-to-serial converter 39, the four-bit head-selection parallel signals are converted to serial signals which are transmitted with the clock to the serial-to-parallel converter 37.

The write data and the read data to-and-from the read-and-write control circuit are switched in the first switching circuit 40 constituting a first switching means, and these data are respectively communicated with the second switching circuit 38. Further, the write-control signal is applied to the first switching circuit 40, and also to the head IC 36 and the second switching circuit 38 of the head assembly. 32.

An FPC 34 connecting between the head assembly 32 and the printed circuit board 33 is formed by a film made of flexible materials. On the film, pattern circuits, each of which has a given width, are formed of control data line 41 for transmitting the head-selection serial signal, clock line 42, write/read (W/R)-data lines-43-1, 43-2, a write-control signal line 44, a GND line 45, 12-V and 5-V power-supply lines 46-1, 46-2. Namely, patterns of eight signal lines are formed on the FPC 34.

Figure 4:
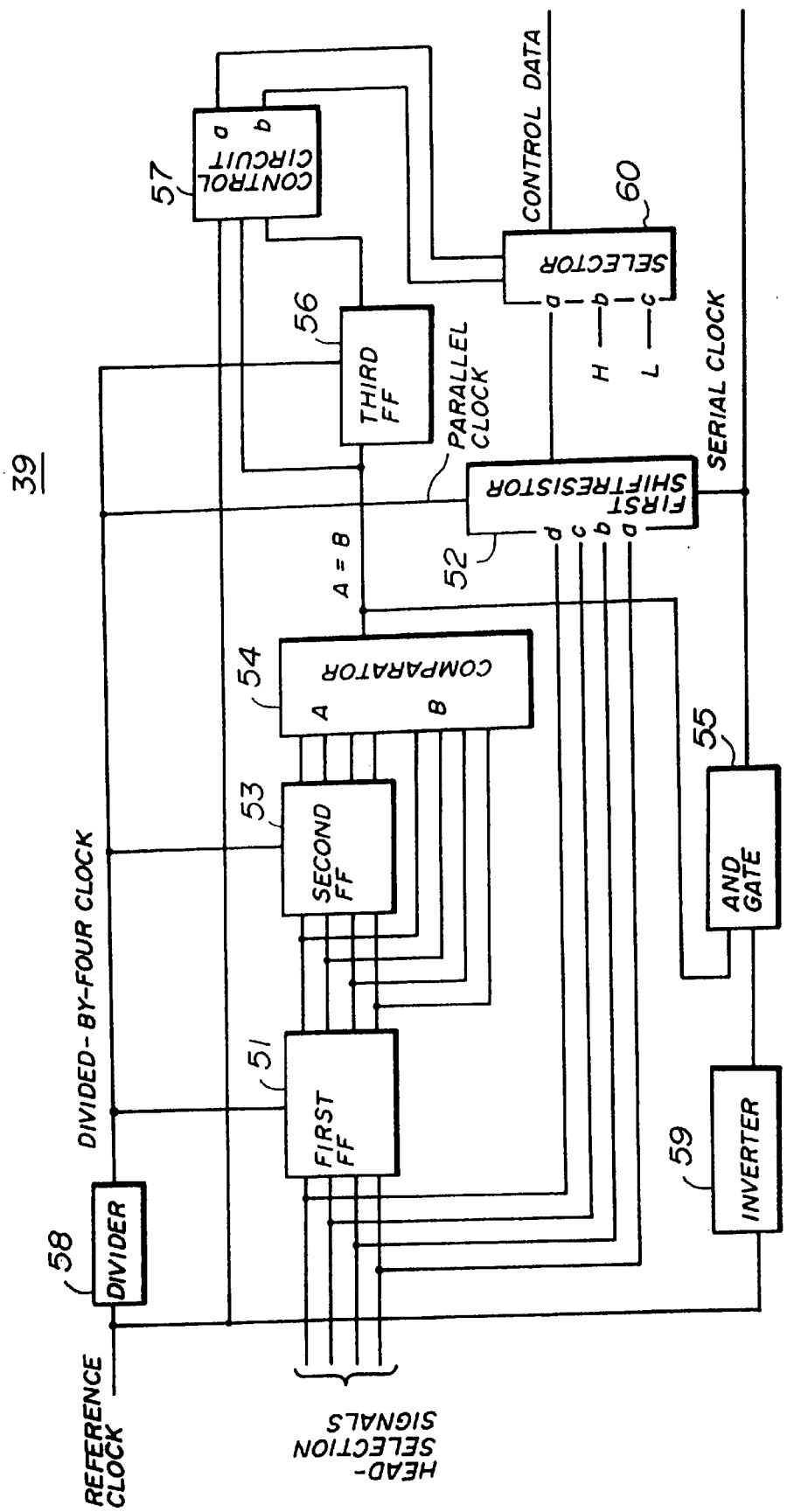
FIG. 4 shows a schematic diagram of a parallel-to-serial converter shown in FIG. 3.

FIG. 4 shows a schematic diagram of the parallel-to-serial converter 39 shown in FIG. 3. In the parallel-to-serial converter 39 shown in FIG. 4, the four-bit head-selection signals are supplied to a first flip-flop (FF) 51 and a- to d-ports of a first shiftresistor 52.

Output signals (4 bits) of the first FF 51 are supplied to a second flip-flop (FF) 53 and a B-group input port of a comparator 54. Output signals (4 bits) of the second FF 53 are supplied to an A-group input port of the comparator 54. An output of the comparator 54 is supplied to an AND gate 55, a third flip-flop (FF) 56, and a control circuit 57.

On the other hand, a reference clock signal is supplied to a divider 58, the control circuit 57, and an inverter 59. An output of the inverter 59 is supplied to the AND gate 55, and is operative as a window of the output of the comparator 54. An output of the AND gate 55 is supplied to the first shiftresistor 52, and is transmitted as the clock to the serial-to-parallel converter 37 of the head assembly 32 through the clock line 42 of the FPC 34.

In the divider 58, the reference clock is divided by four (if the head-selection signals are three bits, the division ratio is three), a divided clock signal is supplied to the first, the second, and the third FFs 51, 53, 56, and also supplied as a parallel clock input to the first shiftresistor 52.

The control circuit 57 is supplied with the output of the comparator 54 and an output of the third FF 56 which is delayed from the output of the comparator 54 by one period of the divided clock. The control circuit 57 produces and transmits two signals, whose end points are different, to a selector 60. To an a-port of the selector 60, an output of the first shiftresistor 52 is supplied, and high (H) and low (L)-level signals are respectively supplied to b- and c-ports. The selector 60 produces the control data as a head-selection serial signal.

Figure 5:
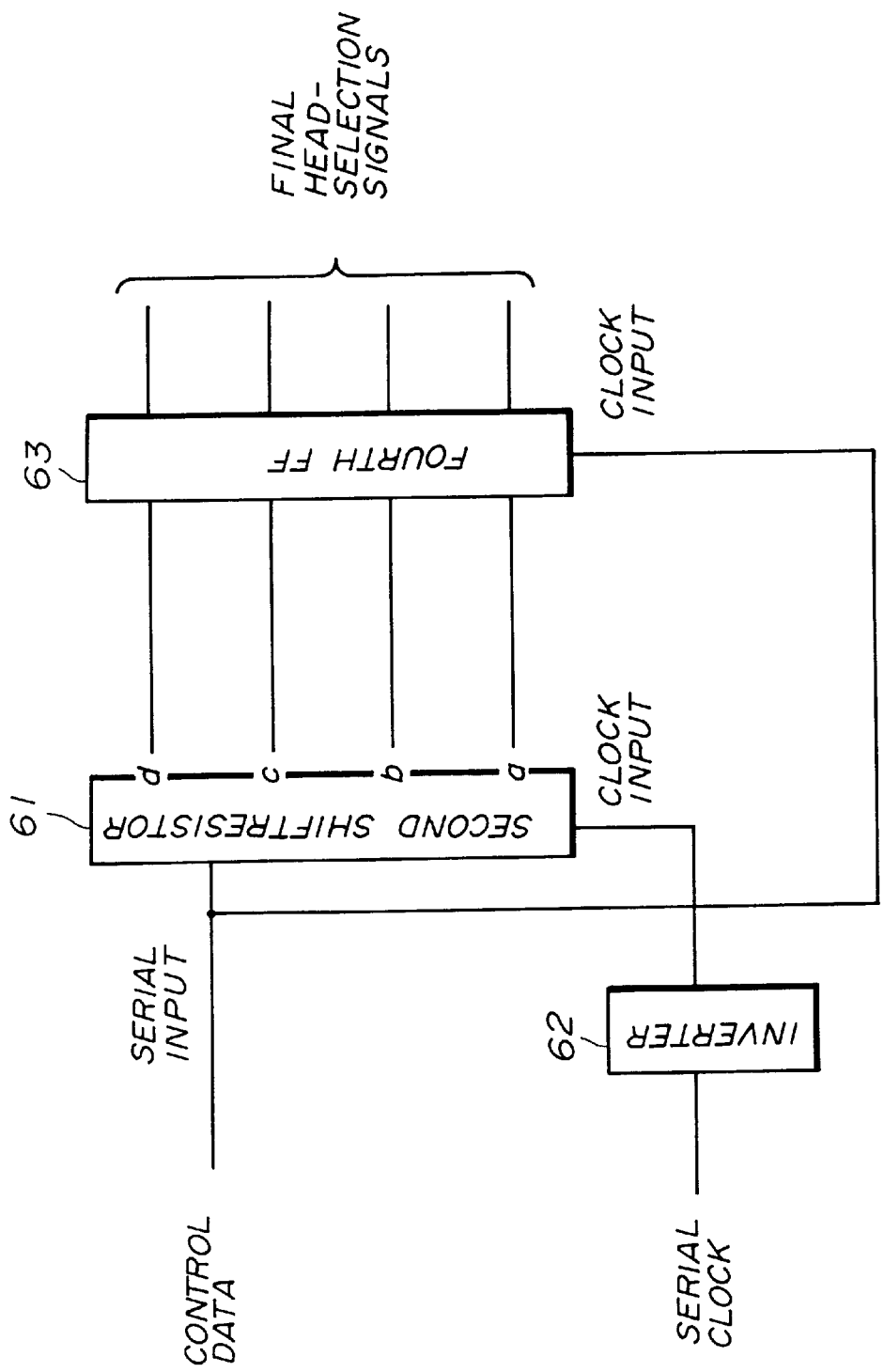
FIG. 5 shows a schematic diagram of a serial-to-parallel converter shown in FIG. 3.

FIG. 5 shows a schematic diagram of the serial-to-parallel converter 37 shown in FIG. 3. In the serial-to-parallel converter 37 shown in FIG. 5, the serial control data (including the head-selection serial signal and a latch signal) from the parallel-to-serial converter 39 is supplied to a second shiftresistor 61. The clock output from the parallel-to-serial converter 39 is also supplied to the second shiftresistor 61 through an inverter 62. The control data is also supplied to a fourth flip-flop (FF) 63.

From a- to d-output ports of the second shiftresistor 61, 4-bit head-selection signals are supplied to the fourth FF 63. The fourth FF 63 produces final 4-bit head-selection signals to the head IC 36.

FIGS. 6A to 6L show time charts of each of the signals of the parallel-to-serial converter 39 shown in FIG. 4. In FIGS. 6A to 6L, the time charts represent a case where the head is switched from a ninth head 35-9 to a sixth head 35-6 by the head-selection signal.

When the head is switched from the ninth head 35-9 to the sixth head 35-6, in FIG. 6B, a head condition is transferred from a write/read condition of the ninth head 35-9 to a write/read condition of the sixth head 35-6 through an idling condition.

The head-selection signals shown in FIG. 6D are supplied in parallel to the first FF 51 and the first shiftresistor 52. The output of the first FF 51 shown in FIG. 6F and the output of the second FF 53 shown in FIG. 6G are compared each other in comparator 54. when the head is not switched, the outputs of the first and the second FFs 51, 53 are same, and an A=B output of the comparator 54 is a low level (FIG. 6H).

When the head is switched, the head-selection signals to the first FF 51 are changed. In this case, the output of the second FF 53 which has been latched before one clock is identical to the output of the first FF 51, thus the A=B output of the comparator 54 is switched to a high level (FIG. 6H).

In this way, the AND gate 55 produces four clock signals from the reference clock (FIG. 6C). These four clocks as the serial clock are supplied to the first shiftresistor 52 and are transmitted to the serial-to-parallel converter 37 of the head assembly (FIG. 6I). When the A=B output of the comparator 54 is at the low level, the serial clock signal is not produced from the AND gate 55.

When the serial clock signal is supplied to the first shiftresistor 52, the head-selection signals, which have been set in the first shiftresistor 52, are transmitted as serial data to the selector 60 (FIG. 6J).

In the control circuit 57, which is supplied with the reference clock signal, the A=B output the comparator 54, and the output of the third FF 56, when the A=B output of the comparator 54 is at the low level, the control circuit 57 produces a high level signal, and when the A=B output is at the high level, the control circuit 57 produces signals as shown in FIG. 6K from output ports a, b thereof to the selector 60.

In the selector 60, according to the output signals from output ports a, b of the control circuit 57, one of the input signals (in a to c) of the selector 60 is selected. When the A=B output of the comparator 54 is at the high level, during a period of the initial four clocks pulses (FIG. 6I) of the reference clock, the input signal at the a-port (the output of the first shiftresistor) of the selector 60 is selected. Then, at the next clock pulse, the L signal (low level) at the c-port of the selector 60 is selected, and at the final clock pulse, the H signal (high level) at the b-port thereof is selected.

In this way, the signal at the a-port, the signal at the c-port, and the signal at the b-port are produced as the control data (including the head-selection serial data and the latch data) from the selector 60 in that order (FIG. 6L). In this case, a selection of the signal at the b-port in the selector 60 corresponds to a final rising edge of the control data.

And, as will be mentioned later, the clock needs to be inserted to latch the head-selection signals in the fourth FF 62 of the serial-to-parallel converter 37. Therefore, the signals at the c- and b-ports of the selector 60 are selected at the end of the control data.

FIGS. 7A to 7D show time charts of each of the signals of the serial-to-parallel converter 37 shown in FIG. 5. In the serial-to-parallel converter 37, when the serial clock is supplied to the second shiftresistor 61 through the inverter 62 (FIG. 7A), the control data from the parallel-to-serial converter 39 is supplied in series to the second shiftresistor 61 and the fourth FF 63. The serial control data is set in sequence at the a- to d-ports of the second shiftresistor 61 according to the inverted serial clock (FIG. 7B).

When the given head-selection signals are set at the a- to d-ports of the second shiftresistor 61, the serial clock shown in FIG. 7A is stopped, and a new serial clock does not start until the next head switching sequence. Then, at the rising edge which is inserted to the head-selection signals in the control data, the fourth FF 63 latches the head-selection signals from the second shiftresistor 61. Therefore, the above helps prevent the head-selection signals from changing by a fault operation of the second shiftresistor 61 due to a noise of the serial clock.

Namely, as shown in FIG. 7D, in a selection period of the ninth head 35-9 and a head switching period, a head selection processing sequence is performed, and during a selection period of the sixth head 35-6, the sixth head 35-6 is selected.

Figure 1:
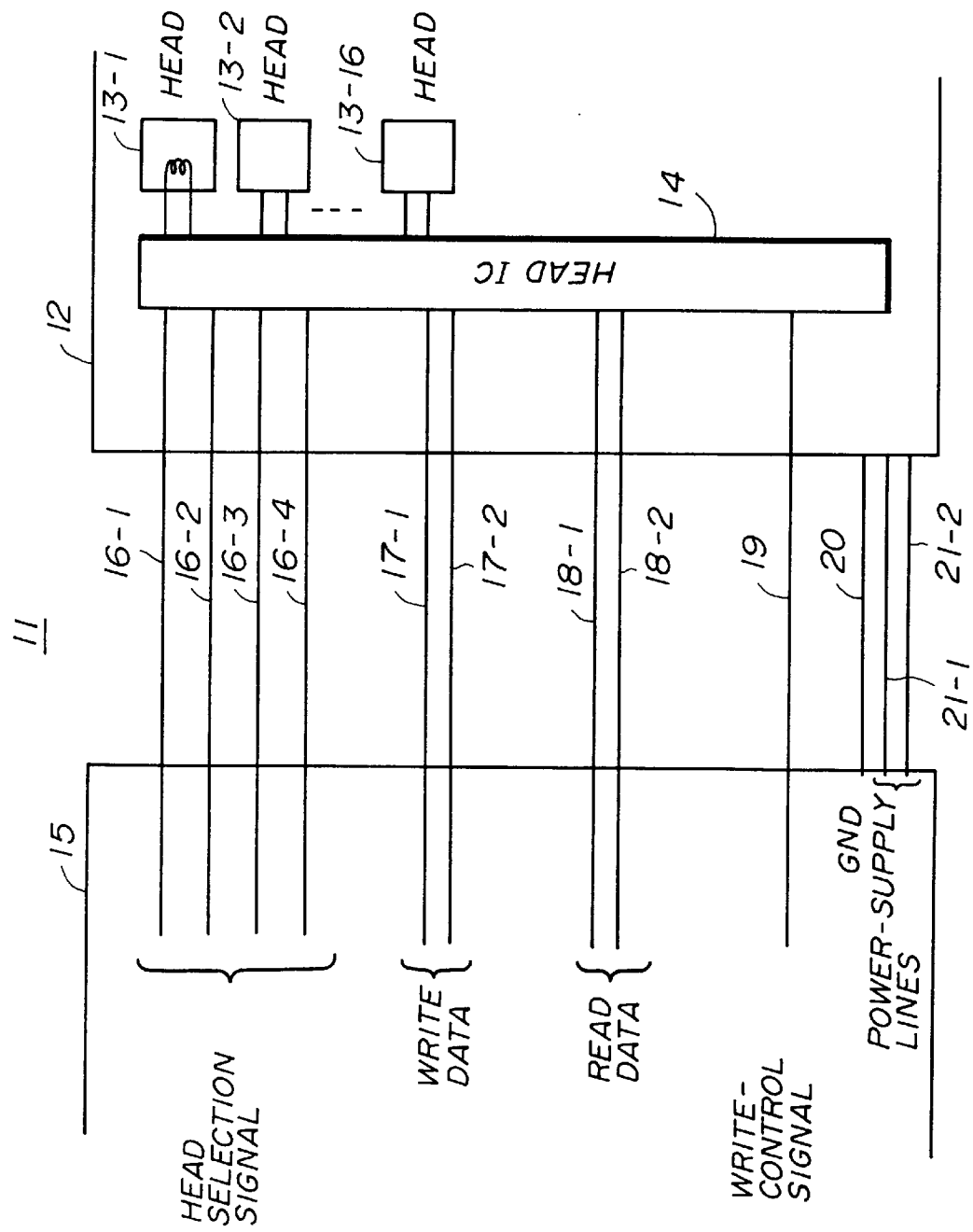
FIG. 1 shows a schematic block diagram of an interface circuit of a conventional magnetic disk unit.
Figure 2:
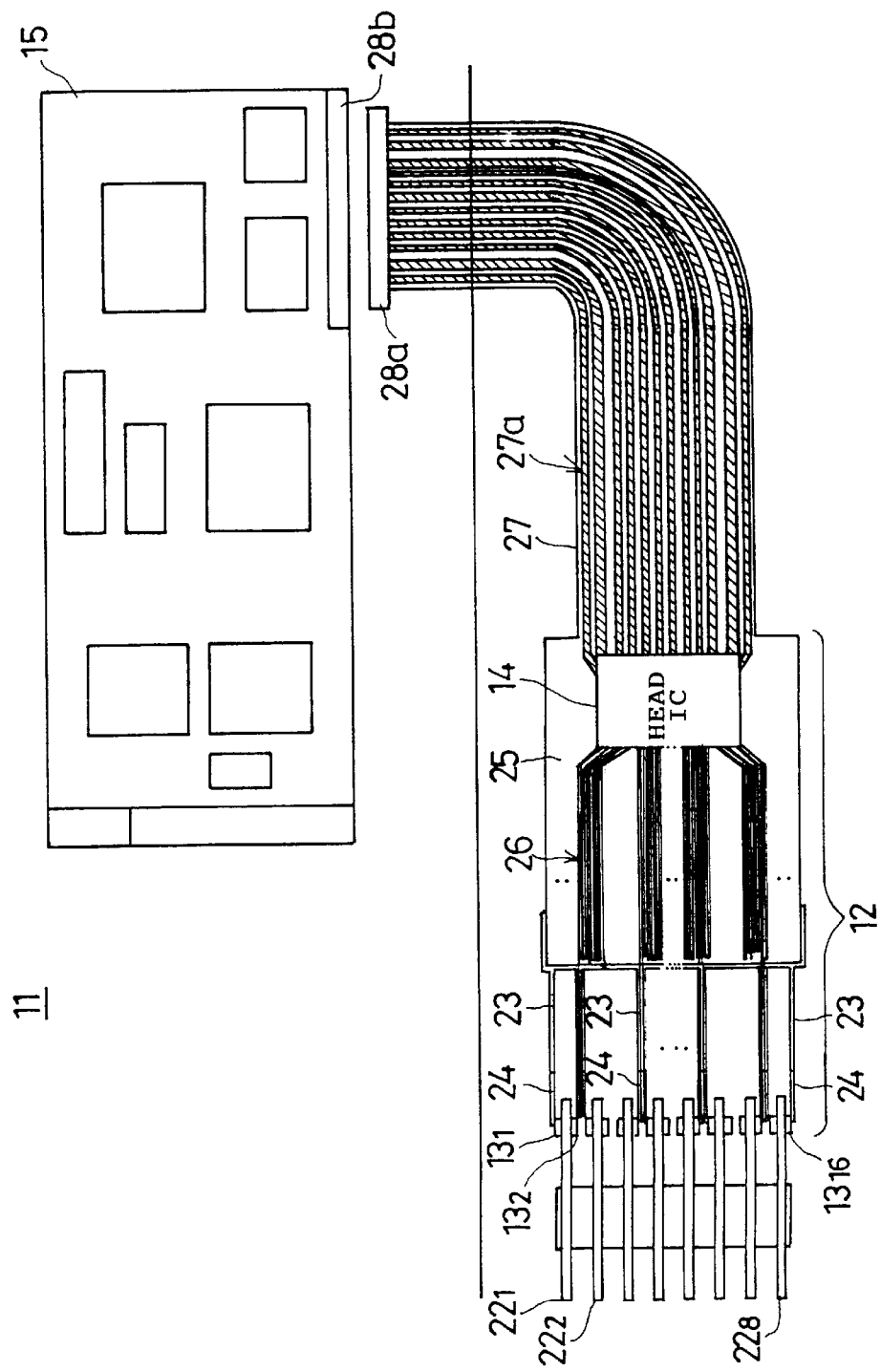
FIG. 2 shows a connecting configuration of the interface circuit in the conventional magnetic disk unit shown in FIG. 1.

In the conventional magnetic disk unit shown in FIG. 1, four signal lines are necessary for selecting one of the sixteen heads 35-1 to 35-16. However, as mentioned above, in the magnetic disk unit according to the present invention, only two signal lines for the control data and the serial clock are necessary. Therefore, such reduction in the number of signal lines makes it possible to miniaturize the unit. And external noise received in a pattern antenna and interference between the signal lines may be reduced. Therefore, noise applied to the recording-and-reproducing signal (data) may be reduced (which will be described in detail later).

In the meantime, it takes a longer time for the serial transmission of the head-selection signals as compared to the parallel transmission thereof. However, in the head-positioning-type magnetic disk unit, an increased time for the serial transmission is extremely small as compared to a head positioning time, thus the increased time does not affect performance of the magnetic disk unit.

Figure 8:
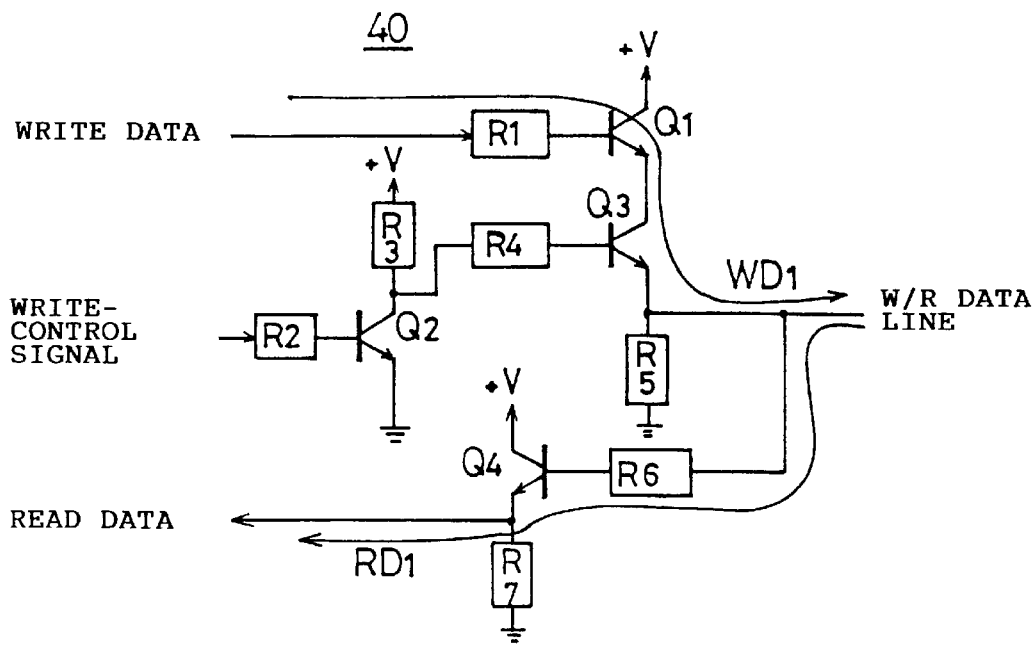
FIG. 8 shows a schematic diagram of a first switching circuit shown in FIG. 3.
Figure 9:
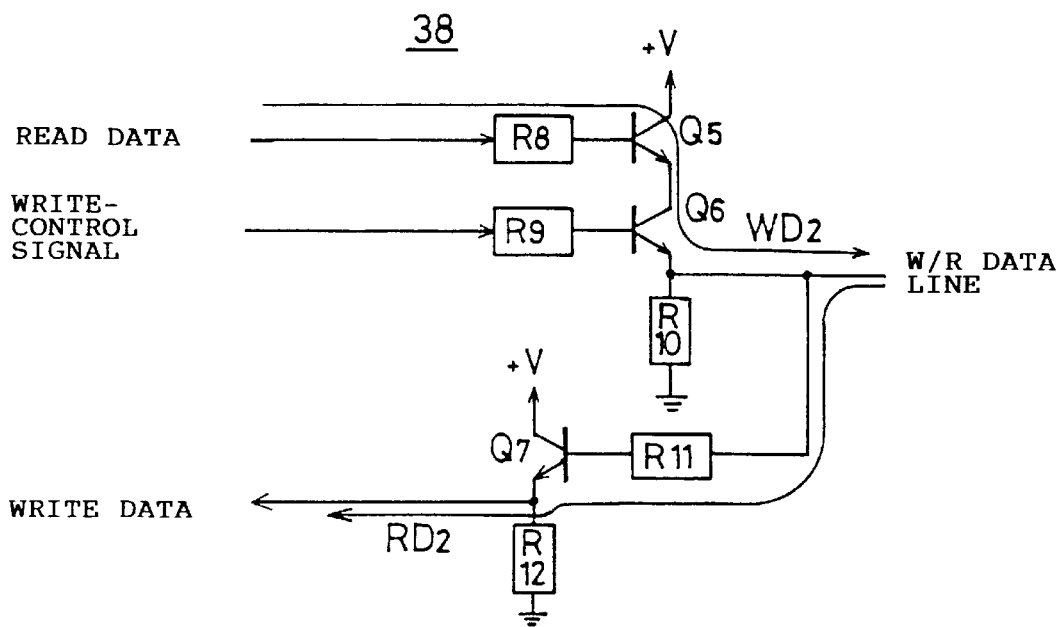
FIG. 9 shows a schematic diagram of a second switching circuit shown in FIG. 3.

FIG. 8 shows a schematic diagram of the first switching circuit 40 shown in FIG. 3. FIG. 9 shows a schematic diagram of the second switching circuit 38 shown in FIG. 3.

In the first switching circuit 40 shown in FIG. 8, the write data biases a base of a transistor Q1 through a resistance R1. A collector of the transistor Q1 is connected to a power supply +V. The write-control signal biases a base of a transistor Q2 through a resistance R2. A collector of the transistor Q2 is connected to the power supply +V through a resistance R3, and to a base of a transistor Q3 through a resistance R4.

A collector of the transistor Q3 is connected to an emitter of the transistor Q1, and an emitter of the transistor Q3 is grounded through a resistance R5. To this resistance R5, the W/R data (read data) is applied.

And the W/R data (write data) biases a base of a transistor Q4 through a resistance R6. A collector of the transistor Q4 is connected to the power supply +V, and an emitter thereof is grounded through a resistance R7. From the emitter of the transistor Q4, the read data is produced.

In the second switching circuit 38 shown in FIG. 9, the read data from the selected head biases a base of a transistor Q5 through a resistance R8. A collector of the transistor Q5 is connected to the power supply +V, and an emitter thereof is connected to a collector of a transistor Q6.

And the write-control signal biases a base of the transistor Q6 through a resistance R9. An emitter of the transistor Q6 is grounded through a resistance R10.

On the other hand, the W/R data (read data) is applied to the resistance R10, and the W/R data (write data) biases a base of a transistor Q7 through a resistance R11. A collector of the transistor Q7 is connected to the power supply +V, and an emitter thereof is grounded through a resistance R12. The write data is applied to the selected head from the emitter of the transistor Q7.

In the first switching circuit 40 shown in FIG. 8, when writing the data, the write-control signal goes to a low level, then, the transistor Q2 is turned off and the transistor Q3 is turned on. In this case, the write data (WD1) from the read-and-write control circuit is supplied to the W/R-data line through the transistors Q1, Q3.

While, when reading the data, the write-control signal goes to a the high level, then, the transistor Q2 is turned on and the transistor Q3 is turned off. Therefore, to the transistor Q4, only the read data (RD1) from the W/R-data line is supplied through the resistance R6, and the read data is produced from the transistor Q4.

In the second switching circuit 38 shown in FIG. 9, when writing the data, the write-control signal goes to the low level, then, the transistor Q6 is turned off. Thus, to the transistor Q7, only the write data (RD2) from the W/R-data line is supplied through the resistance R11, and the write data is produced from the transistor Q7.

When reading the data, if the write-control signal goes to the high level, then, the transistor Q6 is turned on. Therefore, the read data derived from the selected head through the head IC 36 is produced to the W/R-data line through the transistors Q5, Q6.

In this way, by installing the first and the first switching circuits 38, 40, the number of lines for transmitting the data and the control signal may be reduced to three (the number in the conventional unit shown in FIG. 1 is five). Such a reduction of the number of lines leads to a miniaturization of the magnetic disk unit. Further, this reduction of the number of lines makes it possible to reduce reception of the external noise and the interference between the signal lines. Therefore, the above makes it possible to reduce the noise applied to the record signal (data) and the reproduced signal (data) (which will be described in detail later).

In an example disclosed in the Japanese Laid-open Patent No. 6-30505 having a single data signal line, during one transmission, control information is transmitted and received before data information. Therefore, it takes a substantially longer time for the data information and the control information to be transmitted. In the present invention, operations of reading data and writing data are not simultaneously performed, so that a single data line is used for these operations. And in each of the W/R-data lines 43-1, 43-2, the data information without the control information is transmitted and received. It takes a time for the data information to be transmitted. Therefore, a time performance for transmitting-and-receiving the required information in the present invention is not degraded as compared to that of the above reference.

Figure 10:
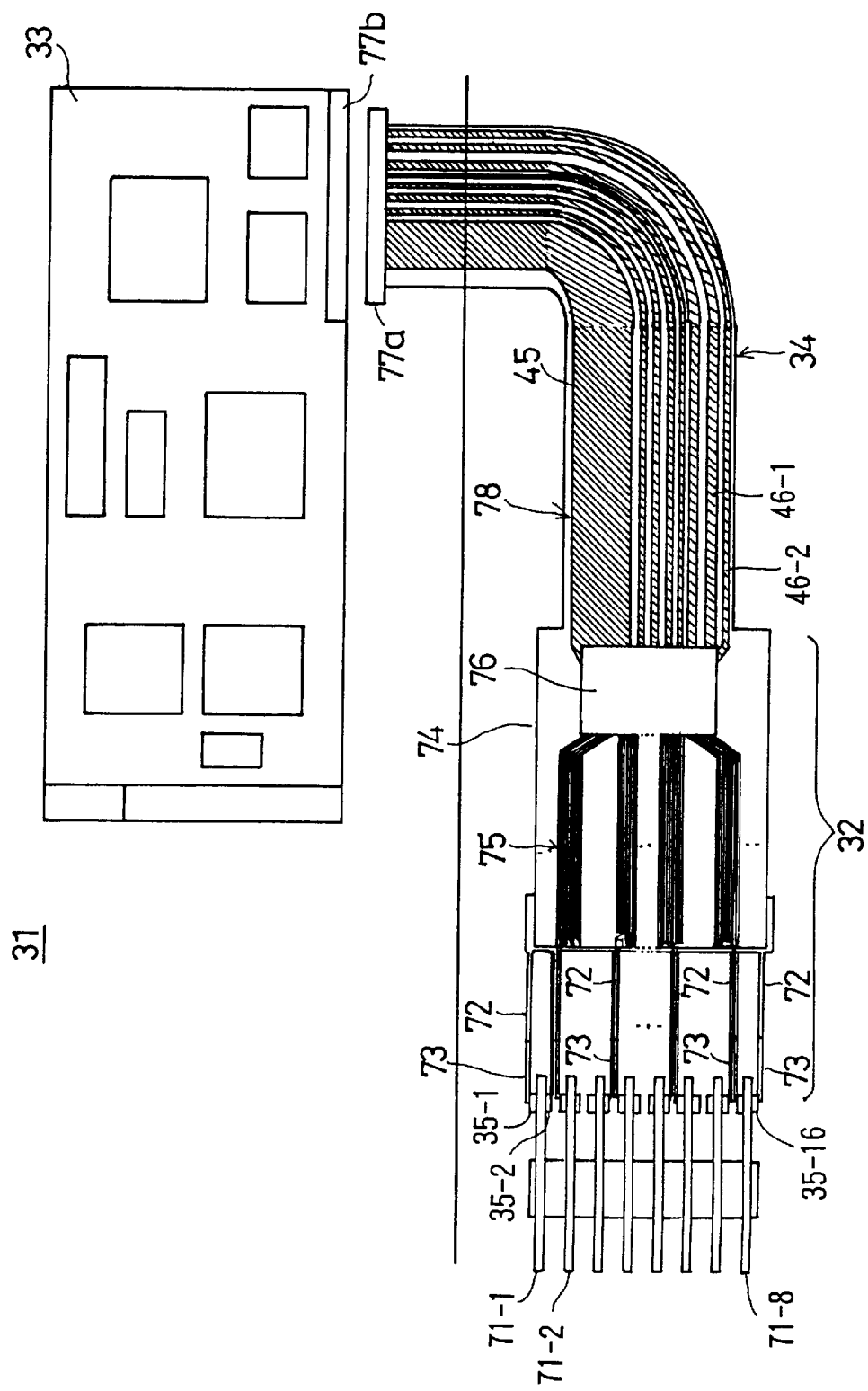
FIG. 10 shows a configuration of an interface circuit of the magnetic disk unit according to the present invention.

Next, FIG. 10 shows a configuration of the interface circuit of the magnetic disk unit according to the present invention. In an example shown in FIG. 10, the head assembly 32 is arranged such that the sixteen heads 35-1 to 35-16 are close to eight magnetic disks 71-1 to 71-8. Each of the heads 35-1 to 35-16 is mounted at the top of a suspension 73 connected with a carriage 72, and can move in a radial direction of the magnetic disks 71-1 to 71-8.

Two signal lines from each of the heads 35-1 to 35-16 are connected to associated pattern lines 75 on a flexible printed circuit board 74 through the suspension 73 and the carriage 72. Each of the pattern lines 75 on the flexible printed circuit board 74 is routed to a given port of the serial-to-parallel converter 37, the second switching circuit 38, and the head IC 36 which are included in a processing part 76.

In the other side of the head IC 36, each port of the head IC 36 is connected to an associated port of one side of the FPC 34. In the other side of the FPC 34, a connector 77a is assembled. In the FPC 34, the above mentioned eight lines of, 41, 42, 43-1, 43-2, 44, the GND line 45, and the power-supply lines 46-1, 46-2, are formed by pattern lines 78 arranged in flat forms.

The thickest one of the pattern lines 78 is allocated to the GND line 45, which is connected to the ground (GND) of the printed circuit board 33 and the flexible printed circuit board 74 to improve suppression of noise. Also, the thickest line may be used for supplying a voltage of about 2 to 3 V as disk-enclosure bias. This disk-enclosure bias is used to prevent an element destruction due to a leak when magnetic-resistance (MR) heads are used for the heads 35-1 to 35-16.

On the other hand, the printed circuit board 33 for controlling and driving the magnetic disk unit 31 comprises a connector 77b, which is connected with the connector 77a, to couple between the printed circuit board 33 and the head assembly 32.

Figure 11:
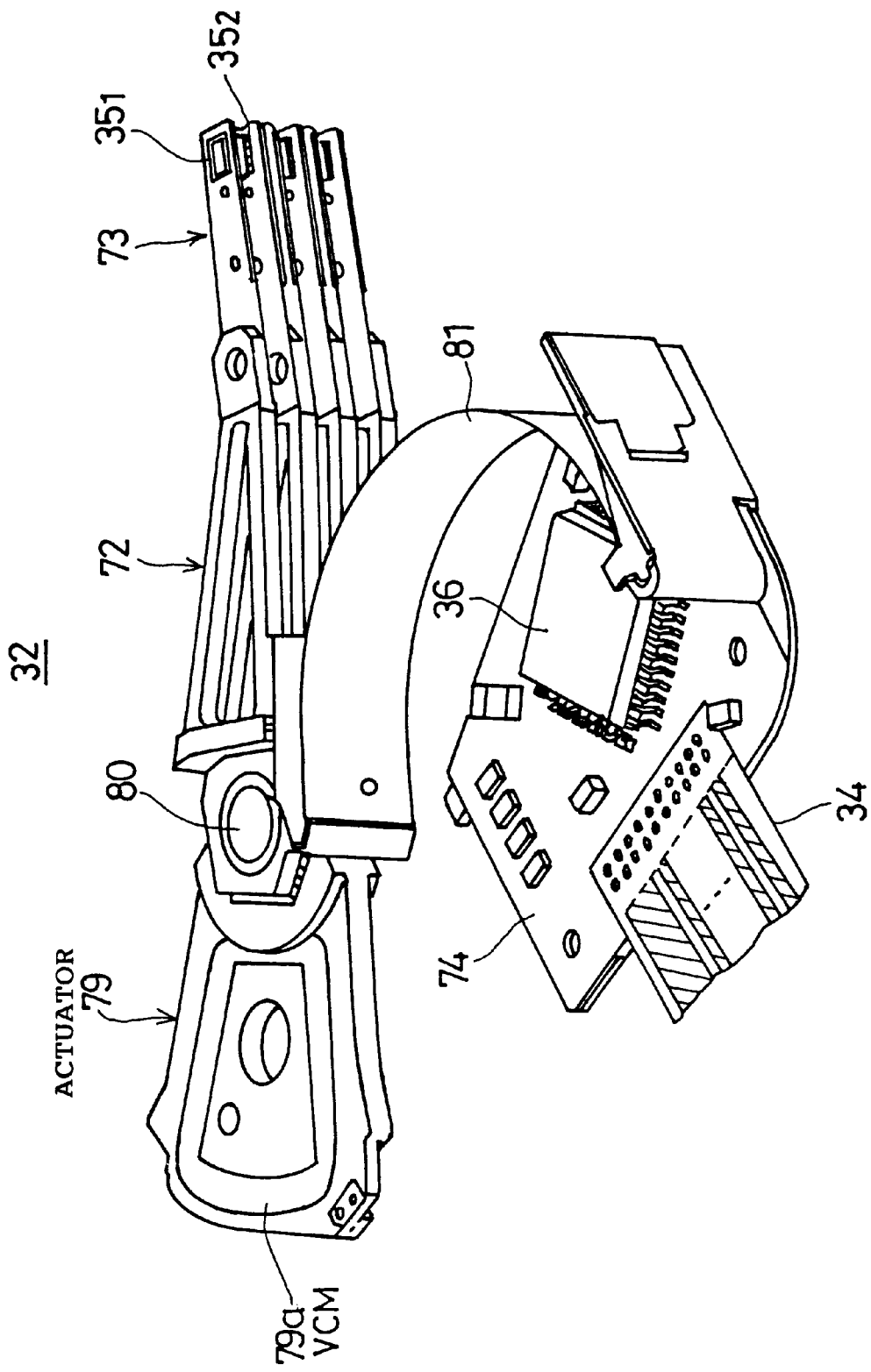
FIG. 11 shows a perspective view of a head assembly using an FPC according to the present invention.

FIG. 11 shows a perspective view of the head assembly 32 using the FPC according to the present invention. And FIG. 12 shows a disassembled construction of the magnetic disk unit using the FPC according to the present invention.

In the head assembly shown in FIG. 11, an actuator 79 comprises a voice coil motor (VCM) 79a, and can rotate freely around a rotational axis 80. The suspensions 73 mounting heads 35-1 to 35-16, and the carriages 72 are mounted to the actuator 79.

The signal lines derived from each of the heads 35-1 to 35-16 through the carriages 72 are connected to the flexible printed circuit board 74 through a flat pattern circuit (FPC) 81. On the flexible printed circuit board 74, the head IC 36, the serial-to-parallel converter 37, and the second switching circuit 38 are mounted. The FPC 34 is also connected to the flexible printed circuit board 74.

Figure 12:
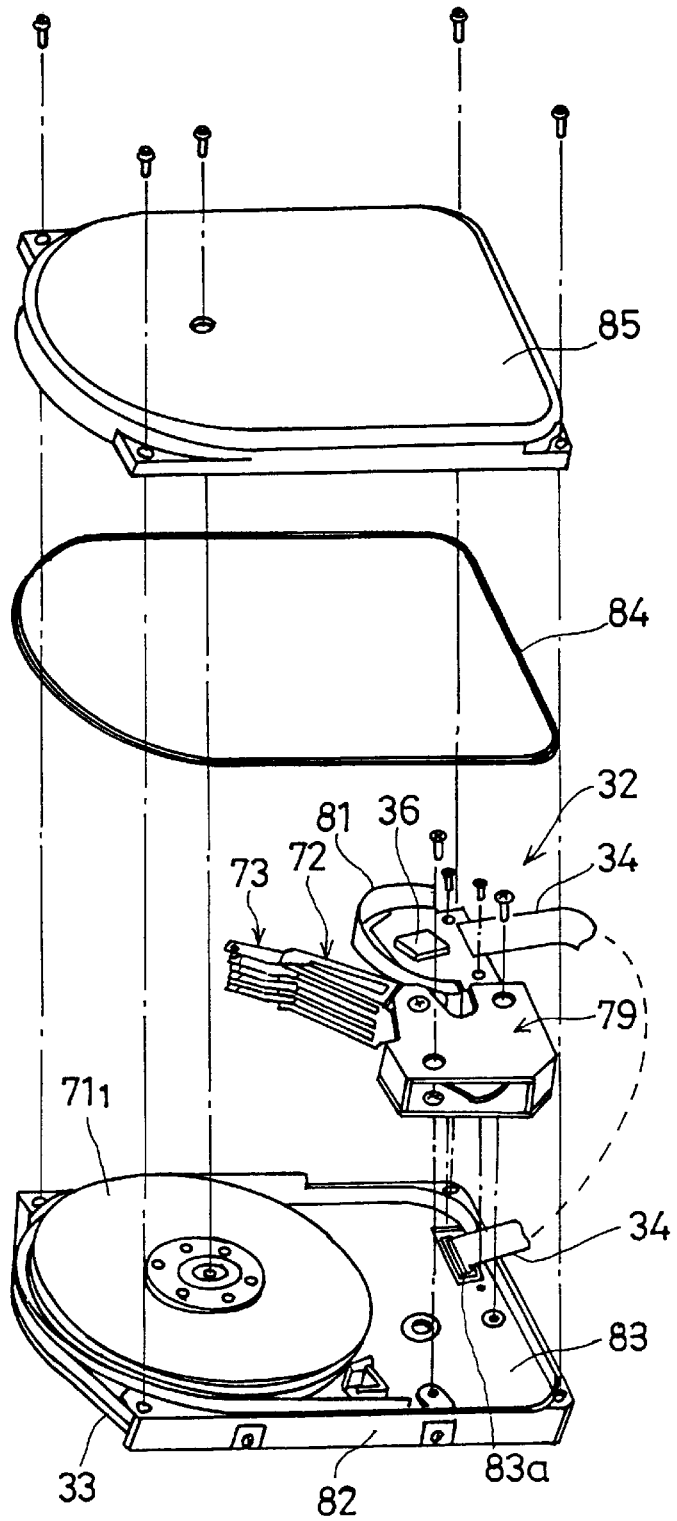
FIG. 12 shows a disassembled construction of the magnetic disk unit using the FPC according to the present invention.

In the magnetic disk unit 31 shown in FIG. 12, magnetic disks 71-1 to 71-8 are located on a base plate 83 installed to a frame 82. The disks are rotated by a spindle motor 84. Under the base plate 83, the printed circuit board 33 is located. In the base plate 83, an open part is formed, and through the open part, the FPC 34 is connected to the under-side of the printed circuit board 33 by the connectors 77a, 77b.

The head assembly 32 shown in FIG. 11 is installed on the base plate 83 such that the heads 35-1 to 35-16 and the magnetic disks 71-1 to 71-8 are interdigitated. The heads 35-1 to 35-16 can move in the radial direction of the magnetic disks 71-1 to 71-8 by rotation of the actuator 79. Finally, a cover 85 is installed on the frame 82 through a packing 84.

Figure 13A:
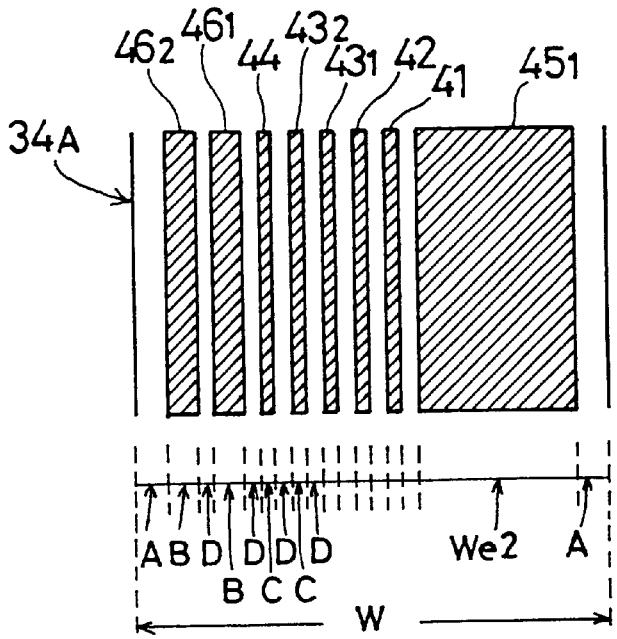
FIG. 13A shows a first configuration of an FPC 34A of the magnetic disk unit according to the present invention.

Next, descriptions will be given of advantages of the memory unit according to the present invention, by referring to FIGS. 13A, 13B and 14. FIG. 13A shows a first configuration of the FPC 34A of the magnetic disk unit according to the present invention. And FIG. 13B shows a configuration of the FPC 27 of the conventional magnetic disk unit.

In the FPC 34A according to the present invention shown in FIG. 13A, if the whole pattern width (FPC width) of the FPC 34A, W, is 28 mm, 8 mm is allocated to a pattern width We2 of a GND pattern 45-1, 3 mm is allocated to each pattern width B of the power-supply (12 V, 15 V) patterns 46-1, 46-2, 1 mm is allocated to each pattern width C of the other signal lines 41, 42, 43-1, 43-2, 44, 1 mm is also allocated to an interval width D between two of any patterns, and 1 mm is also allocated to each of both-side spaces A.

Figure 13B:
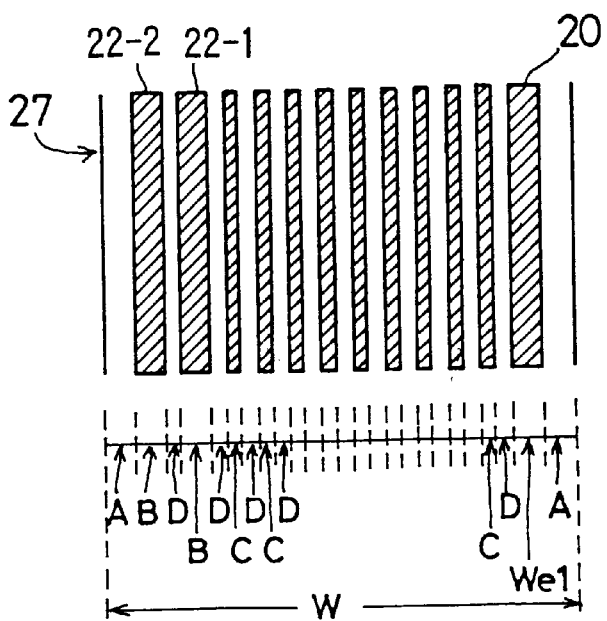
FIG. 13B shows a configuration of an FPC 27 of the conventional magnetic disk unit shown in FIGS. 1 and 2.

In the conventional FPC 27 shown in FIG. 13B, if the whole pattern width W of the FPC 27 is 28 mm, 3 mm is allocated to a pattern width We1 of the GND pattern 20, 3 mm is allocated to each pattern width B of the power-supply (12 V, 15 V) patterns 22-1, 22-2, 1 mm is allocated to each pattern width C of the other signal lines, 1 mm is also allocated to the interval width D between two of any patterns, and 1 mm is also allocated to each of the both-side spaces A.

Namely, when the whole pattern widths of the FPC 34A according to the present invention and the conventional FPC 27 are the same, the pattern width We2 of the GND pattern 45-1 in the FPC 34A may be enlarged to 8 mm by 5 mm as compared to 3-mm width We1 in the FPC 27.

Now, pattern resistance of the GND pattern will be simulated for the FPC 34A according to the present invention and the conventional FPC 27.

Assuming that a length Le, a thickness, and a pattern conductivity $\rho$ of each of the GND patterns 45-1, is 100 mm, 0.05 mm, and 0.0172 m$\Omega$·mm, respectively, the pattern resistance Ra of the GND pattern 45-1 in the FPC 34A according to the present invention is obtained as follows:

$$Ra = \rho \times Le/(We2 \times d) = (0.0172 \times 100)/(8 \times 0.05)$$

$$= 4.3 \ (m\Omega).$$

And the pattern resistance Rb of the GND pattern 20 in the conventional FPC 27 is obtained as follows:

$$Rb = \rho \times Le/(We1 \times d) = (0.0172 \times 100)/(3 \times 0.05)$$

$$= 11.47 \ (m\Omega).$$

Therefore, the pattern resistance of the GND pattern according to the present invention may be reduced 37.5% of the conventional GND pattern.

Next, pattern inductance of the GND pattern will be simulated for the FPCs 34A, 27.

The pattern inductance La of the GND pattern 45-1 in the FPC 34A according to the present invention is obtained as follows:

$$La = 0.0002 \times Le \times (\log((2 \times Le)/(We2 \times d)) + 0.5 + 0.224 \times (We2 \times d)/Le)$$

$$= 0.18 \ (\mu H).$$

And, the pattern inductance Lb of the GND pattern 20 in the conventional FPC 27 is obtained as follows:

$$Lb = 0.0002 \times Le \times (\log((2 \times Le)/(We1 \times d)) + 0.5 + 0.224 \times (We1 \times d)/Le)$$

$$= 0.2 \ (\mu H).$$

Therefore, the pattern inductance of the GND pattern according to the present invention may be reduced by 10% as compared to the conventional FPC.

In general, the length Le of the GND pattern is longer than its pattern width We and the thickness d, therefore, a reduction ratio of the pattern inductance is represented in the following equation.

$$La/Lb = \log((2 \times Le)/(We2 \times d))/\log((2 \times Le)/(We1 \times d))$$
$$= 0.86.$$

Further, comparing pattern impedances of the GND patterns 45-1 and 20 at a frequency of 10 MHz, the pattern impedance Za of the GND pattern 45-1 according to the present invention is 11.3 (Ω), and the pattern impedance Zb of the conventional GND pattern 20 is 12.6 (Ω).

In general, when the impedance of the GND pattern is large, namely the resistance and the inductance are large, a large voltage difference occurs across the pattern. More specifically, when the inductance of the GND pattern is increased, a high-frequency voltage is increased across the pattern, thereby making its operation unstable.

According to the present invention, the pattern impedance of the GND pattern 45-1 may be reduced and the foregoing makes it possible to reduce the noise. Therefore, a stable operation of the head IC 36 may be performed.

Figure 14:
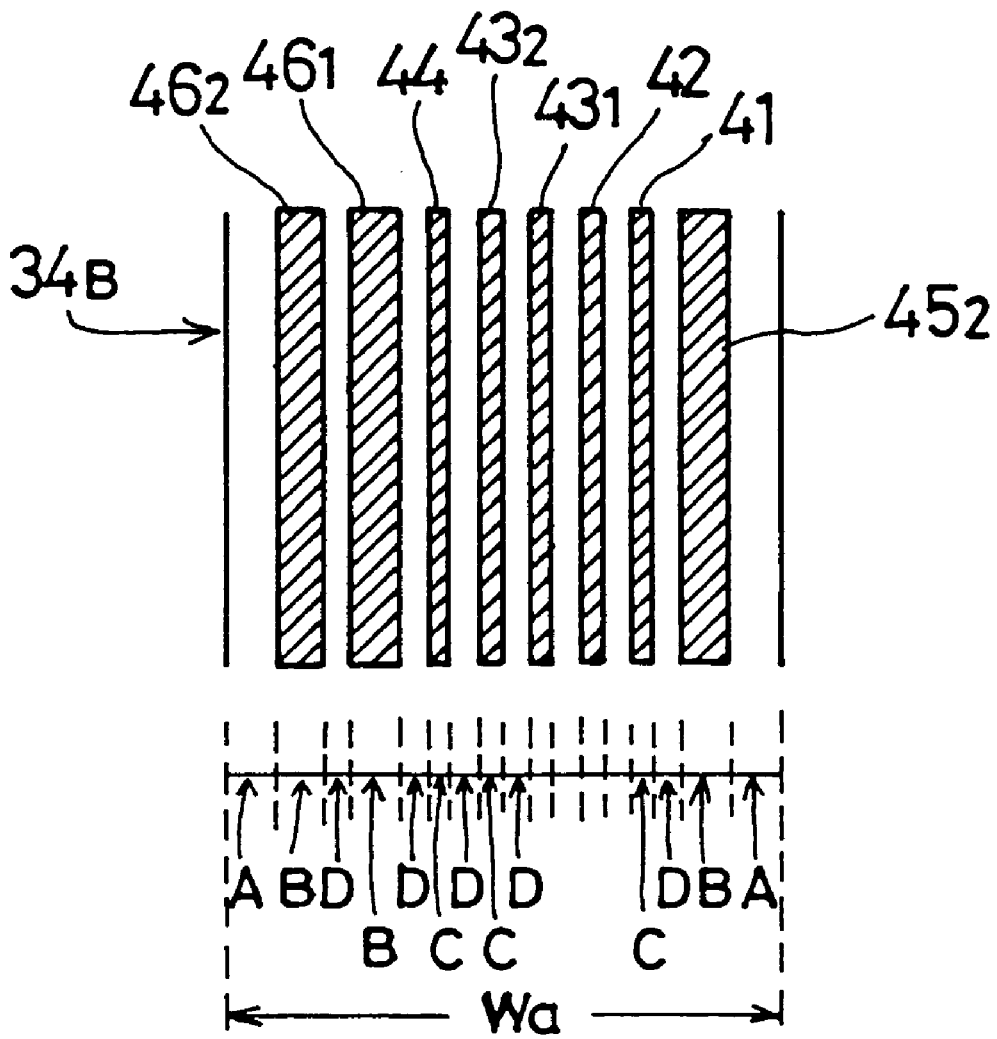
FIG. 14 shows a second configuration of an FPC 34B of the magnetic disk unit according to the present invention.

FIG. 14 shows a second configuration of the FPC 34B of the magnetic disk unit according to the present invention. In the second configuration, the pattern width of a GND pattern 45-2 according to the present invention is set to 3 mm which is the same pattern width as that of the conventional GND pattern 20. In this case, the whole pattern width Wa of the FPC 34B may be reduced by 8 mm to 20 mm as compared to the width 28 mm of the conventional FPC 27.

Therefore, while keeping the same pattern impedance as that of the conventional pattern, the width of the FPC 34B may be more narrow than the conventional width. Thus, a width of the connector 77a also may be narrow. In this way, an mounting area of the connector 77b on the printed circuit board 33 may be reduced, and the reduced width makes it possible to miniaturize the whole magnetic disk unit.

In the above embodiments, the construction, that the FPC 34 connects the head assembly 32 with the printed circuit board 33, is represented, however it is noted that the magnetic disk unit using a flat cable, etc., instead of the FPC may have the same advantages. In the case of using the flat cable, by using a thick GND code, the noise may be reduced, and using a narrow-size flat cable enables the unit size to be small.

As described above, the present invention has the following features.

First, the head-selection signal is transmitted as the serial data from the parallel-to-serial converter to the serial-to-parallel converter through the FPC. In the serial-to-parallel converter, the head-selection signal is converted from the serial data to the parallel data, which is transmitted to the head IC to a selected one of the heads.

Therefore, the number of head-selection signal lines of the FPC may be reduced, thus the whole unit size may be reduced. Further, the external noise affection and the interference between the signal lines may be reduced, so as to enable reduction of noise otherwise applied to the control data such as the head-selection signal.

Second, the record data to the head IC and the reproduced data from the head IC are switched in the first and the first switching circuits. Namely, the switched data from one of the record data and the reproduced data is transmitted between the first and the first switching circuits through the single line of the FPC.

Therefore, the number of data-transmission lines of the FPC may be reduced, thus the whole unit size may be reduced. Further, the external noise affection and the interference between the signal lines may be reduced, so as to enable reduction of noise applied to the record data and the reproduced data.

Third, the wide-width patterns are formed on the flexible material for the ground line and the disk-enclosure bias line. Therefore, the impedances of the patterns may be reduced, so that the noise applied to the transmission data also may be reduced.

Further, the present invention is not limited to these embodiments, but various variations and modifications may be made without departing from the scope of the present invention.

What is claimed is:

1. A memory unit having a disk enclosure which encloses a plurality of heads performing at least one of recording or reproducing operations on a storage medium and a printed circuit board which controls said disk enclosure, said memory unit comprising:

first converter means, located on said printed circuit board, for receiving head-selection signals for selecting one of said plurality of heads as first parallel data, and converting the head-selection signals to first serial data to be transmitted;

signal lines connecting said printed circuit and said disk enclosure and having a serial line to transmit the head-selection-signals in serial;

second converter means, located inside said disk enclosure, for receiving said first serial data of the head-selection signals from said first converter means and converting said first serial data to second parallel data to be transmitted; and head control means, located inside said disk enclosure, for receiving said second parallel data of the head-selection signals from said second converter means and selectively driving said heads on the basis of said second parallel data of the head-selection signals.

2. The memory unit as claimed in claim 1, wherein said memory unit further comprises connecting means, including a line for said first serial data, for connecting said first converter means and said second converter means together, and said line has conductive patterns formed on a flexible material.

3. The memory unit as claimed in claim 2, wherein said connecting means further comprises a first pattern of predetermined width and second patterns of predetermined width, said first pattern of predetermined width being wider than said second patterns of predetermined width and being formed on said flexible material.

4. The memory unit as claimed in claim 3, wherein said first pattern of predetermined width is connected to a ground.

5. The memory unit as claimed in claim 4, wherein said first pattern of predetermined width provides a disk enclosure bias inside the unit.

6. The memory unit as claimed in claim 1, wherein said memory unit further comprises:

first switching means for switching between transmission of record data to said heads and reception of reproduced data from the heads along the same path, said first switching means being located in said disk enclosure; and second switching means for switching between reception of said record data from said first switching means and transmission of said reproduced data to the first switching means along the same path.

7. A memory unit having a disk enclosure which encloses a plurality of heads performing recording and reproducing operations on a storage medium and a printed circuit board which controls said disk enclosure, said memory unit comprising:

> read-write control means, located on said printed circuit board, for transmitting recording data to said heads and receiving reproduced data from said heads;
>
> a first write data line and a first read data line each connected to said read-write control means;
>
> head control means, located inside said disk enclosure, for driving said heads for the recording and reproducing operations;
>
> a second write data line and a second read data line each connected to said head control means;
>
> first switching means located on said printed circuit board and connected to both of said first write and read data lines;
>
> second switching means located inside said disk enclosure and connected to both of said second write and read data lines; and
>
> signal lines connecting said printed circuit board and said disk enclosure and having a single data line connecting said first and second switching means;
>
> wherein said first and second switching means selectively connect said first and second write data lines through said single data line during the recording operation and selectively connect said first and second read lines through said single data line during the reproducing operation.

8. The memory unit as claimed in claim 7, wherein said first switching means is located on a printed circuit board controlling the memory unit, and said second switching means is located inside a disk enclosure having said heads and said storage medium.

9. The memory unit as claimed in claim 8, wherein said memory unit further comprises connecting means, including a line for said record data and said reproduced data, for connecting said first switching means and said second switching means together, and said line has a conductive pattern formed on a flexible material.

10. The memory unit as claimed in claim 9, wherein said connecting means further comprises a first pattern of predetermined width and second patterns of predetermined width, said first pattern of predetermined width being wider than said second patterns of predetermined width and being formed on said flexible material.

11. The memory unit as claimed in claim 10, wherein said first pattern of predetermined width is connected to a ground.

12. The memory unit as claimed in claim 11, wherein said first pattern of predetermined width provides a disk enclosure bias inside the unit.

13. A memory unit having a disk enclosure which encloses a plurality of heads performing at least one of recording or reproducing operations on a storage medium and a printed circuit board which controls said disk enclosure, said memory unit comprising:

> a parallel-to-serial converter, located on said printed circuit board, converting a first parallel head-selection signal to a serial head-selection signal;
>
> a serial line connected to said parallel-to-serial converter and transmitting the serial head-selection signal from said parallel-to-serial converter;
>
> a serial-to-parallel converter, located inside said disk enclosure and connected to said serial line, converting the serial head-selection signal to a second parallel head-selection signal; and
>
> a head control circuit, located inside said disk enclosure and connected to said serial-to-parallel converter, selectively driving said heads on the basis of the second parallel head-selection signal.

\* \* \* \* \*